J. R. POND.
Process and Apparatus for Granulating and Desiccating Milk, Sugar, &c.
No. 219,411.                    Patented Sept. 9, 1879.
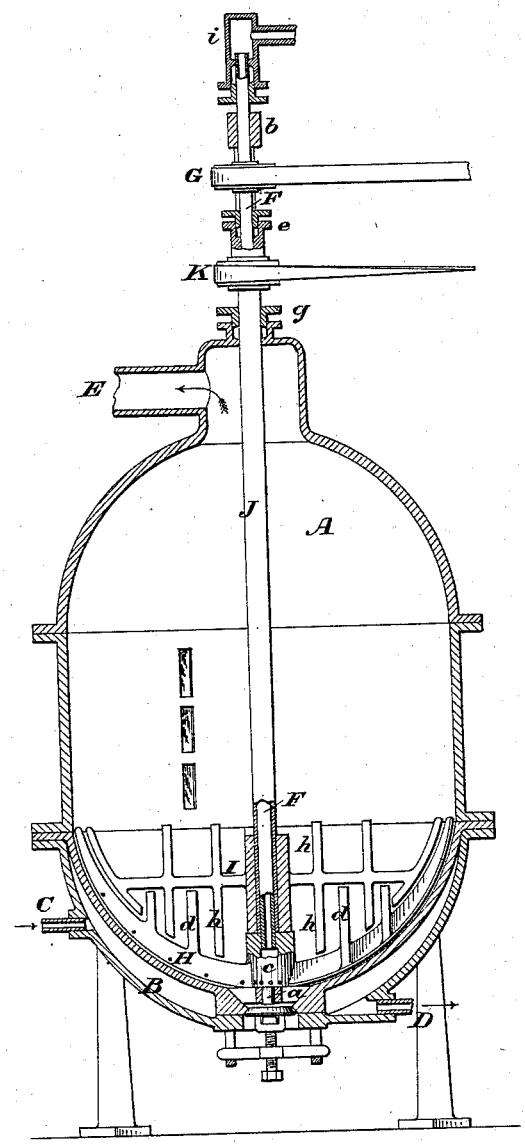

UNITED STATES PATENT OFFICE.

JULIUS R. POND, OF NEW HARTFORD, CONNECTICUT.

IMPROVEMENT IN PROCESSES AND APPARATUS FOR GRANULATING AND DESICCATING MILK, SUGAR, &c.

Specification forming part of Letters Patent No. 219,411, dated September 9, 1879; application filed June 10, 1879.

*To all whom it may concern:*

Be it known that I, JULIUS R. POND, of New Hartford, in the county of Litchfield and State of Connecticut, have invented certain Improvements in Granulating and Desiccating Milk, Sugar, and other Substances and Materials, of which the following is a specification.

My invention relates to improvements in the art of desiccating or drying and granulating milk, sugar, and other substances while under the influence of heat in closed vessels; and it consists, partly, in the method of so desiccating and granulating, wherein jets of air are introduced below the solid or semi-solid mass in the heated and closed vessel behind the advancing arms of rotating agitators, and into the temporary cavities formed in the mass behind the said arms, the mass being at the same time broken up by stirrers.

It also consists in the mechanism or apparatus especially adapted to and employed for this purpose, all as will be hereinafter more particularly described.

In carrying out my invention I introduce air, either cold or hot, but preferably hot and dry, at the bottom of the desiccating-vessel, under the mass to be dried and granulated, and force it through the same either directly or by suction or atmospheric pressure, or by both combined. To accomplish this successfully it is important that the drying and solidifying mass be constantly agitated, and that the air be admitted in jets distributed impartially, or nearly so, over the bottom of the vessel, so that the air, in passing upward through the mass, may come in contact with it at every point, and with as near an approach to uniformity as is practicable, so as to dry and granulate it all evenly. I prefer, therefore, to employ the apparatus shown in the accompanying drawing, which represents a vertical mid-section of my improved desiccating and granulating apparatus.

A represents a close air-tight vessel, provided with a steam-heating jacket, B, at the bottom. C is the steam-inlet, and D the steam-outlet, or the outlet for the water of condensation. E is the outlet at the top, which connects with the ordinary condenser and air-pump, or any other device for producing the proper degree of vacuity in the vessel A by exhaustion. F is a vertical tubular shaft, which is stepped at $a$ in the bottom of the vessel, and properly provided with a bearing at $b$ above, or near the top. This shaft is provided with a driving-pulley, G, or some other suitable gearing, whereby it may be rotated, and at its lower end is connected with and fixed to an agitator or stirrer, H. This agitator is made to conform to the shape of the bottom of the vessel A, which in this case is hemispherical; but it may be of some other form as well.

The curved arms of the agitator H, of which there may be one or more, are hollow, or partially hollow, and their cavities are connected with the bore of the shaft F through a hollow boss, $c$. The arms are somewhat triangular in section, being beveled down to an edge on their advancing sides, as shown at the right in the figure, while their rear and lower faces are respectively vertical and horizontal. The blades are perforated at the back for about two-thirds of their length with small holes, reaching into their cavities, and the boss $c$ is similarly perforated, the object being to admit air at numerous points under the mass in the vessel while the agitator H is being rotated. The rotating beveled arms shave the solidifying mass from the sides of the vessel and allow the air to rise between the same and the mass, while vertical fingers $d\ d$ on the arms cut the mass at various distances from the center.

To aid in agitating the mass while it is being granulated, I also employ an auxiliary stirrer or agitator, I, fixed to the lower extremity of a tubular shaft, J, which slips over the shaft F, and has packed bearings, one at its upper end, $e$, and another at $g$, where it passes into the vessel. This shaft is also provided with a driving pulley or gear, K, and is driven in an opposite direction to the shaft F. This agitator I has vertical fingers $h\ h$, the lower of which play between the fingers on the other stirrer when they are rotated.

If desired, another stirrer of a similar kind may be mounted on the shaft J above the stirrer I.

Air is admitted at the top of the tubular shaft F, and if a forced blast is desired, the blower-pipe should be connected with said shaft by means of a packed coupling, as shown at $i$ in the figure. Where a vacuum is produced in the vessel by exhaustion at E, this will not generally be necessary, as the air will enter under an atmospheric pressure of ten or twelve pounds to the square inch, which will be sufficient to force it through the agitated mass and bring it into contact with every part of the same.

By means of this method the wettest sugar may be thoroughly dried and granulated, as well as milk, eggs, and other substances, and so thoroughly can the moisture be eliminated that the substances so acted upon can be preserved without difficulty in any climate and for any length of time.

When treating very liquid substances I do not usually set the agitators in motion until the mass begins to thicken; but they may be run from the beginning.

In lieu of the hollow perforated arms of the agitator H, the said arms may be made solid, and perforated tubes or pipes branching from the hollow shaft F may be arranged to lie close behind them. This construction would serve the same purpose.

I am aware that air has been introduced into the liquid in evaporating and distilling apparatus through perforated tubes arranged to rotate in the vessel. Such devices, however, serve only to aerate the liquid, and the arms are not constructed and adapted to leave cavities behind them to receive jets of air.

I am also aware that hollow cutting-arms with broad perforated backs, connected with a hollow central shaft, through which steam is conveyed to said arms, have been employed in machines for cutting and cooking fish; but the arrangement and purpose here are not in any way analogous to that contemplated in my invention.

I claim—

1. The herein-described method of granulating and desiccating substances, which consists in introducing jets of air into the solid or semi-solid mass in the closed and heated granulating-vessel behind the advancing arms of the rotating agitators, substantially as and for the purposes set forth.

2. In a granulating and desiccating apparatus adapted for carrying out the herein-described process, the combination of the hollow shaft F, arranged to be rotated, the radial arms H, brought to an edge on their advancing faces and left broad or blunt at the back, as described, and the desiccating and granulating vessel A, the arms being constructed and arranged to fit the inner contour of the vessel, as and for the purposes set forth.

3. In a granulating and desiccating apparatus adapted for carrying out the herein-described process, the combination of the closed vessel A, the hollow axial shaft F, the beveled arms H, constructed and arranged as described, and provided with vertical fingers $d\ d$, and the hollow shaft J, provided with a fingered agitator, I, all arranged to operate substantially as and for the purposes set forth.

In witness whereof I have hereunto signed my name in the presence of two subscribing witnesses.

JULIUS R. POND.

Witnesses:
ARTHUR C. FRASER,
HENRY CONNETT.